Oct. 8, 1929.  W. G. MAYER  1,730,777
CLAMPING BRACKET
Filed Jan. 14, 1927
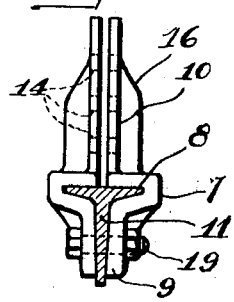
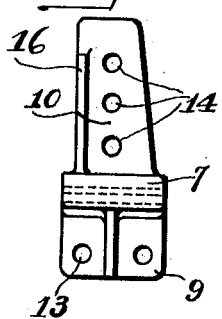
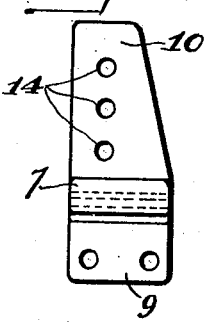
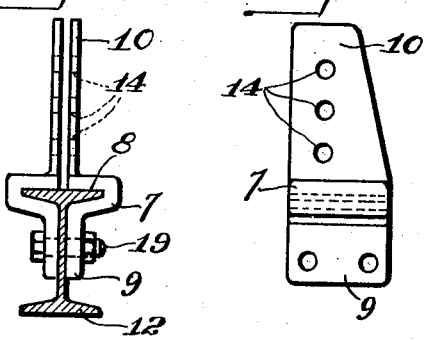
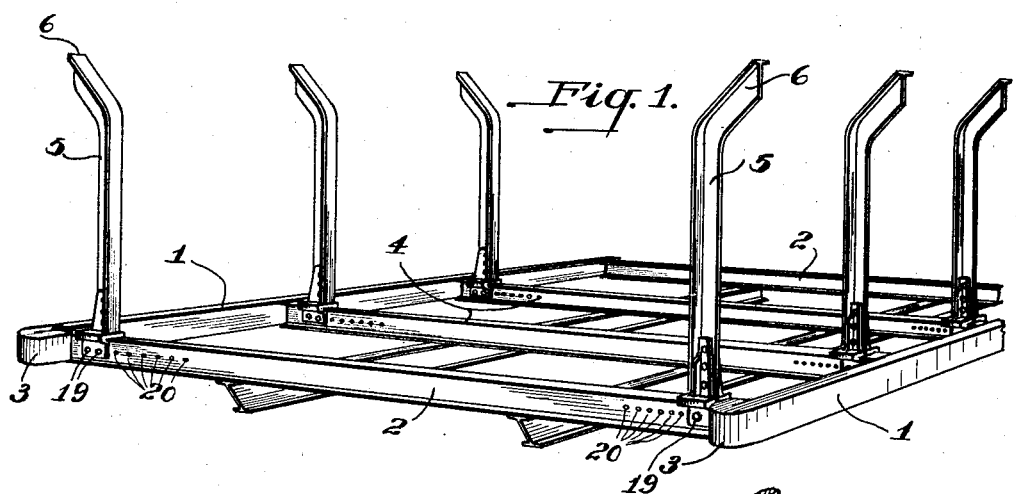
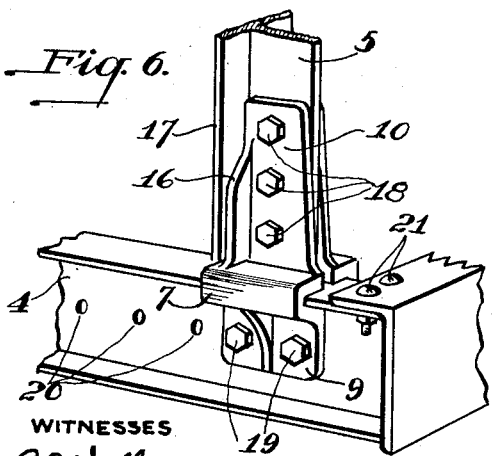
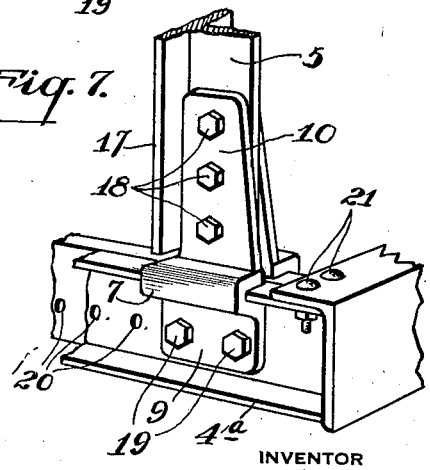
WITNESSES
A. B. Wallau.
William B. Jaspert.
INVENTOR
William G. Mayer
by
Winter Brown & Critchlow
his attorneys.

Patented Oct. 8, 1929

1,730,777

UNITED STATES PATENT OFFICE

WILLIAM G. MAYER, OF PITTSBURGH, PENNSYLVANIA

CLAMPING BRACKET

Application filed January 14, 1927. Serial No. 161,170.

This invention relates to vehicle frame structures, more particularly to the frame construction of automobile bodies and the manner of forming the same.

It is among the objects of the invention to provide a frame structure for truck bodies or the like which shall be of simple and durable mechanical construction and of relatively light weight readily assembled and disassembled without special tools.

One of the objects of this invention is the provision of clamping brackets which are particularly suitable for engaging the uprights constituting the body side-frame supports to the sub-frame structure, and which shall readily permit lateral adjustment of the vertical frame portion on the supporting bed.

Still another object of the invention is to provide clamping brackets which are designed to be readily attachable to the structural forms commonly employed in the cross braces of vehicle sub-frames and which shall be adapted to secure side-frame members of structural shapes, and which shall be further adapted to be readily dismembered when it is desired to alter the shape of the truck body.

The present invention is a continuation in part of an application bearing Serial Number 737,877, filed September 15, 1924, entitled Truck body construction which discloses a truck body structure the frame portion of which embodies standardized shapes or structural members.

The present invention features special clamps which are provided for joining various structural shapes in the manufacture of truck bodies by the use of which the engaged members may be rigidly secured in place or dismembered, or adjusted to new positions, as the case may be.

In the accompanying drawings constituting a part hereof and in which like reference characters designate like parts, Fig. 1 is a view in perspective of a truck body frame structure embodying the principles of this invention; Fig. 2 is a side elevational view of a pair of clamping brackets employed in joining the structural elements shown in Fig. 1; Fig. 3 is a front elevational view thereof; Fig. 4 illustrates the application of a clamping bracket to an I-beam section; Fig. 5 is a front elevational view of a somewhat modified form of clamping bracket; Fig. 6 is an enlarged detail in perspective illustrating the engagement of the clamping bracket at one end with the upright constituting the side frame structure and at its other end with the end frame or cross brace; and Fig. 7 is a similar view illustrating the application of the clamping bracket shown in Fig. 5 to two channel bars, uniting them in effectively an I-bar.

Referring to Fig. 1 of the drawings the structure therein illustrated comprises a truck frame embodying side and end frame portions 1 and 2, respectively, which are joined to constitute a substantially rectangular frame. One end of each of the side frame portions 1 are cut and bent in the manner shown to constitute end bumpers 3 formed integrally with the side frames. The side and end frames are preferably channel members but may be formed of angle bars or other structural sections as desired. Extending transversely of the side frames 1 are a plurality of braces or reinforcing members 4 which are preferably I-beams, but which may be formed of a pair of channel bars $4^a$ in back-to-back relation as in Fig. 7, or which may be in the form of T-bars as illustrated in Fig. 2.

The transverse braces 4 are detachably secured at their ends to the side frames 1 in any suitable manner, as by bolts 21, to constitute the sub-frame a rigid supporting structure.

In the building of truck bodies the side members are attached to uprights or side braces 5 which are commonly formed of T-bars and diverted at their extended ends 6 to receive the flare boards, not shown.

Clamping brackets 7, having slotted openings 8, depending flange portions 9, and projecting portions 10, are adapted when joined to engage a structural section such as a T-bar 11, Fig. 2, or an I-beam 12, Fig. 4, or back-to-back channels, Fig. 7, which are the sections constituting the cross braces 4 of the sub-frame. The clamping brackets are provided with openings 13 and 14 adapted to receive bolts which extend through perforations in the cross braces 4 or end members 2, the uprights 5, respectively, to which the clamping brackets are joined to secure the uprights on the sub-frame structure.

The manner of assembling the uprights 5, the cross braces 4 and end frames 2 is more clearly illustrated in connection with Figs. 6 and 7. The clamping brackets shown in Fig. 6 are provided with flange portions 16 which engage the flanged faces 17 of the T-bars constituting the side braces 5 to provide greater surface contact and a more rigid construction. The bracket shown in Fig. 7 is not flanged and rests directly against the flange portion 17 of the T-bar.

In either form of construction the clamping brackets when secured to the end frame 2 or transverse braces 4 are adapted to receive the uprights or side braces 5 which have been previously perforated with openings adapted to register with the openings 14 of the bracket, and the side braces are secured by extending bolts 18 therethrough, which when screwed down constitute the assembled members a unitary structure.

Bolts 19 connect the lower portions 9 of the brackets, through holes 20 provided at equal distances apart in the webs of the transverse members 2, 4, and 4ª, as illustrated in Figs. 1 and 6. The clamps may thus be attached through any two adjacent holes 20, thus permitting ready lateral positioning of the uprights 5.

As illustrated in Fig. 1 the clamping members are adapted to be adjusted by sliding them on the end frames and side braces to provide a body structure the transverse walls of which may be of any desired width, and for this purpose it is only necessary to perforate the end braces and cross braces with sufficient openings to permit such adjustment.

The employment of clamping brackets in the construction herein described permits shipping the assembled supporting frame and side braces without previously joining them as they are readily joined in the manner illustrated by attaching the clamping brackets without requirement of special skill or special tools.

The structure shown in the illustration utilizes side braces having flared ends to receive the flare boards of the truck body, but it is obvious that the side braces may be of any length and disposed in suitable spaced relation to provide a body of any suitable width, of either the closed or open body type, by simply loosening the clamps and adjusting them on the end frames and side braces and by replacing the side braces with braces of the desired form and length This is accomplished by simply removing the bolts and substituting the uprights.

It is evident from the foregoing description of this invention that truck frame structures made in accordance therewith are relatively simple in construction, mechanically durable and of relatively light weight. The clamping brackets utilized permit changing the body from a flared side truck to an enclosed body member by substituting a suitable upright for the diverted braces illustrated in the drawings.

I claim:

1. In a truck body structure, a bracket for connecting upright side members to transverse frame members, the frame members being composed of structural sections having upper flanges and depending webs, said bracket comprising two oppositely disposed clamping members having complementary recesses adapted to engage the said flanges on both the upper and lower sides thereof, and downward projections below the recesses adapted to engage the webs of said frame members, and having upward projections adapted to detachably engage the upright members, and bolt-receiving openings in said clamping members adapted to be aligned with similar openings in the other members, the upward projections being provided with laterally extending flanges for engagement with said upright member.

2. In a truck body structure, a bracket for connecting upright side members to transverse frame members, the frame members being composed of structural sections having upper flanges and depending webs, said bracket comprising two oppositely disposed clamping members having complementary recesses adapted to engage the said flanges on both the upper and lower sides thereof, and downward projections below the recesses adapted to engage the webs of said frame members, and having upward projections adapted to detachably engage the upright members, and bolt-receiving openings in said clamping members adapted to be aligned with similar openings in the other members.

3. In a truck body structure, the combination of a frame having transverse members comprising back-to-back channels forming in effect an I-section, and upright structural side frame members, with brackets for rigidly clamping said channels and said frame members together, said brackets comprising pairs of complementary opposed recessed clamps adapted to seat on top of the transverse frame members, each clamp having a depending portion adapted to engage the web and the under side of the flange of the frame member, and an upper extension adapted to engage the upright side member, the clamps having holes for receiving bolts adapted to pass therethrough and through the said members.

4. A truck body structure comprising a frame having transverse members of I-section and upright side frame members, brackets for rigidly clamping said frame members together, said brackets comprising pairs of opposed complementary recessed clamps adapted to seat on top of the transverse frame member, having depending jaw portions adapted to engage the under side of the top flange and the web thereof, and upper extensions adapted to engage the upright members, the clamps having holes for receiving bolts adapted to pass through the said transverse and upright members, and the transverse members being bored to permit lateral adjustment of the clamps thereon.

In testimony whereof, I sign my name.

WILLIAM G. MAYER.